United States Patent [19]
Barton

[11] Patent Number: 5,444,968
[45] Date of Patent: Aug. 29, 1995

[54] OUTBOARD CROP DIVIDER STRUCTURE GUARD ASSEMBLY

[76] Inventor: Herald M. Barton, 19052 Kale Ave., Silver Lake, Minn. 55381

[21] Appl. No.: 337,335

[22] Filed: Nov. 9, 1994

[51] Int. Cl.6 .................... A01D 45/02; A01D 63/04; A01D 75/00
[52] U.S. Cl. ................. 56/119; 56/DIG. 24
[58] Field of Search .............. 56/119, 94, 84, 91, 56/92, 99, DIG. 24

[56] References Cited

U.S. PATENT DOCUMENTS

| | | | |
|---|---|---|---|
| 2,867,961 | 1/1959 | Heilbrun | 56/119 |
| 3,462,922 | 8/1969 | Phillips et al. | 56/119 X |
| 4,137,695 | 2/1979 | Samman | 56/119 |
| 4,255,920 | 3/1981 | Janzen | 56/126 |
| 4,346,548 | 8/1982 | Atkinson | 56/119 |

Primary Examiner—Stephen J. Novosad
Attorney, Agent, or Firm—Roger W. Jensen

[57] ABSTRACT

An outboard guard assembly includes a support tube, barrier panel attached to the support tube, and reinforcing brace attached to the barrier panel. The outboard guard assembly is mounted on each of a pair of outboard crop divider structures of an existing multi-row crop gathering header used to harvest crops planted in rows, such as corn. When installed on the outboard crop divider structures at either end of the multi-row corn header, the outboard guard assembly improves the effectiveness of the multi-row crop gathering header and reduces yield loss caused by variation in row spacing and bent and tangled corn stalks.

20 Claims, 5 Drawing Sheets

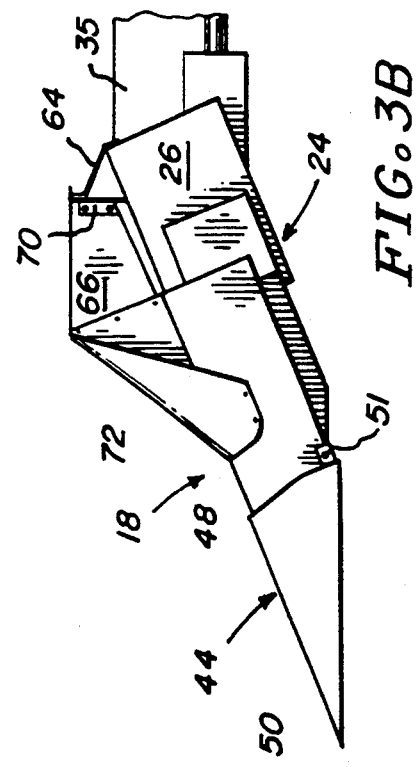
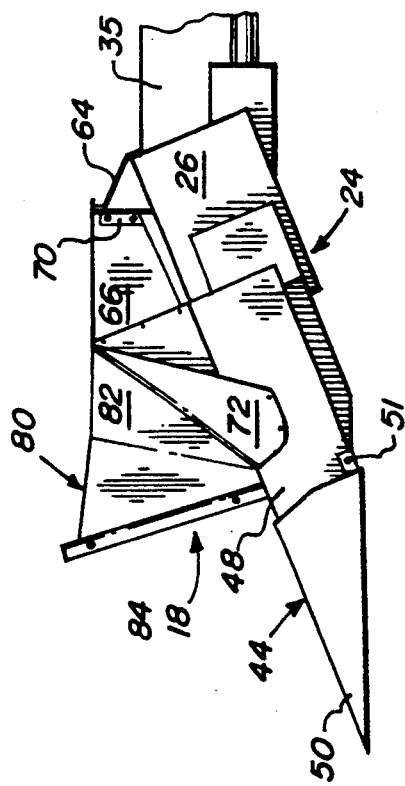
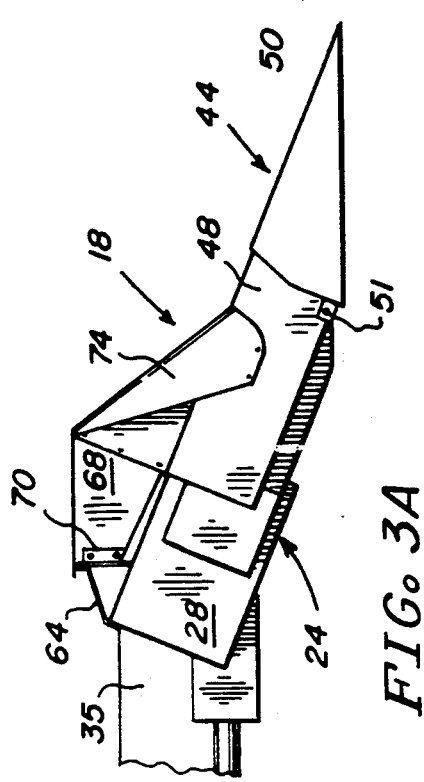
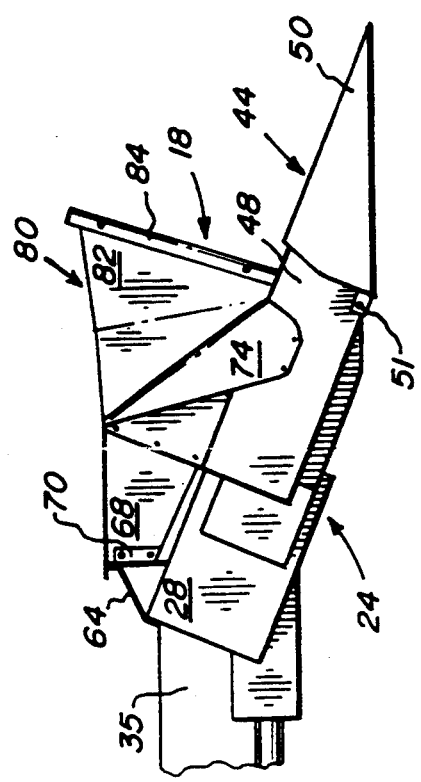

OUTBOARD CROP DIVIDER STRUCTURE GUARD ASSEMBLY

BACKGROUND OF THE INVENTION

1. Field of the Invention

The present invention generally relates to multi-row crop gathering headers or combines such as corn combines or pickers and, more particularly, is concerned with an outboard crop divider guard assembly for mounting at each of the opposite lateral ends of a multi-row crop gathering header.

2. Description of the Prior Art

Crops such as corn are generally planted in a series of parallel rows. Typical corn planters are 4 row, 6 row, 8 row and 12 row. The rows are frequently 30 inches apart, but other spacings are sometimes used. For example, some farmers use 40 inch spacing. To harvest corn a multi-row crop gathering header, usually referred to as a corn combine, is usually employed. The corn combine has a plurality of laterally-spaced-apart divider structures, or snoots, which form or define therebetween crop-receiving passageways. The corn combine is attached to a harvesting machine and the operator of the harvesting machine aligns the crop-receiving passageways with the rows of standing corn stalks. As the corn combine moves forward parallel to the rows of corn, the stalks enter the passageways where the ears of corn are stripped and gathered by the corn header leaving the stalks in the ground. Typical corn pickers are sized 2 row, 4 row, 6 row and 8 row. It is not uncommon for a farmer to have a planter with a number of rows which differs from the number of rows of the harvesting combine. For example, a farmer might plant corn using a 12 row planter and to harvest corn with an 8 row corn picker.

When using a corn combine to harvest corn, a first loss of yield can result due to variation in row spacing. An example of such variation is illustrated in FIG. 7. When rows of corn are planted using a 12 row planter, a first set of rows AA is planted as the planter is pulled across the field by a tractor. Then the planter is turned and a second set of rows BB is planted as the planter passes across the field in the opposite direction. The planter is turned and makes more passes as necessary to cover the entire field. The space Y between each of the 12 rows in a given set is uniform; however, because the planter must be turned and cross the field again, the space X between each set of rows varies. The variation in the size of X depends upon the skill of the driver of the tractor pulling the planter. When an 8 row corn combine is used to harvest corn planted by a 12 row planter, it is possible, for the first pass of the combine, to align the crop-receiving passageways of the combine with the first 8 rows of a 12 row set because the space Y between the rows is uniform, but when the corn combine is turned for the next pass it straddles the space X between adjacent sets. Since the space X varies, it is difficult if not sometimes impossible to align the passageways of the combine with the last 4 rows of the first set and the first 4 rows of the second set. Misalignment of the passageways with the rows of corn reduces the effectiveness of the corn picker in receiving with the corn stalks and thus in gathering the corn ears therefrom in the; rows at the opposite ends of the header resulting in loss of yield.

A second loss of yield is related to stalks being tangled and bent. The force of the wind blowing across a corn field may tangle and bend the corn stalks as they grow. Also, late growing season storms (sometimes with heavy wet snow) can have a devastating effect on the corn stalks and attached ears, bending the stalks away from the optimum vertical attitude sometimes to a near horizontal attitude. A third loss of yield is related to insect damage to the stalks and/or the ear attachment to the stalk; for example corn borers may weaken (i) the stalk (to cause it to fall off vertical) and/or (ii) the ear attachment (to reduce the strength of the ear attachment). Tangled and bent corn stalks and damaged ear attachments also reduce the effectiveness of the corn combine by permitting loss, i.e., movement of corn ears outwardly past the opposite lateral ends of the header resulting in loss of yield. To explain, and as is well understood by those skilled in the art, during the combining as the corn stalk enters the throat or narrowed portion of the passageway between adjacent divider structures, the stalk is caught by a hook-like lug on an endless chain which accelerates the movement of the stalk towards the rear end or back of the combine. If the stalk is vertical, the corn ears also tend to be moved toward the rear end. However, if the stalk is off-vertical and/or if the ear attachments are weak, as is sometimes the case, then the aforementioned acceleration can cause the ears to be thrown off of the stalk with considerable velocity and in a direction significantly away from the longitudinal (i.e., direction of travel of the corn picker). Some of these ears are thrown outboard of the picker. Such "errant" ears end up on the ground and can not be economically retrieved.

Rear wall vertical height extension panels and side wall vertical height extension panels with arcuate side guide panels have been mounted on corn headers to improve their effectiveness. However, these additions have proved inadequate in addressing the yield loss problems from the corn ear loss at the opposite lateral ends of the header due to the aforementioned conditions of row spacing variation and of tangled and bent stalks.

Consequently, a need still exists for an assembly to employ on the multi-row crop gathering corn header or combine which will improve the effectiveness of the corn header and reduce the yield loss caused by variation in row spacing, bent and tangled corn stalks, and/or weakened ear attachments to the stalk.

SUMMARY OF THE INVENTION

The present invention provides an outboard crop divider guard assembly for the combine designed to satisfy the aforementioned needs by avoiding the drawbacks of the prior art without introducing other drawbacks. The outboard crop divider guard assembly of the present invention is mounted on the outboard divider structure at each of the respective opposite lateral ends of the multi-row corn combine or header. The outboard crop divider guard assembly comprises a barrier panel and a support tube mounting the barrier panel upright upon and extending above or over the respective outboard crop divider structures of the combine. The outboard crop divider guard assembly also includes a reinforcing brace for mounting the barrier panel to the respective opposite lateral end of the combine.

One feature of the outboard crop divider guard assembly of the present invention is that it may easily be mounted on the respective outboard crop divider structure at the left and right lateral ends of existing multi-row corn pickers. The support tube is mounted on and extends upward from the respective outboard crop divider structure. The barrier panel is attached along its forward edge to the support tube and extends rearward from the support tube and upward from the crop divider structure. Inclining the barrier panel and support tube outward improves the effectiveness of the assembly. The reinforcing brace attaches to the barrier panel providing additional support.

A second feature of the present invention is that it may be installed on multi-row corn pickers having a rear wall vertical height extension panel and side wall vertical height extension panels with arcuate side guide panels thereby adding to the advantages that these extensions provide. The barrier panel is mounted on the crop divider structure inside of the arcuate side guide panel and is attached along its rear edge to the forward edge of the side wall vertical height extension panel.

In summary, with an outboard crop divider guard assembly of the present invention installed on each of the outboard crop divider structures at the opposite ends of a multi-row corn header, the corn header has a significant advantage over a corn header which does not incorporate the; present invention. The present invention reduces yield loss caused by variation in row spacing, bent and tangled stalks, anti/or weakened ear attachments. The employment of the outboard crop divider assembly of the present invention has improved crop yields by as much as one bushel per acre.

Another advantage of the present invention is that when a combine is used to harvest corn by the combine machine passing through the fields at an angle to the rows, the outboard crop divider structures function to capture corn stalks and loose ears that would otherwise become errant. As an example a farmer with a combine having an 8 row picker with 30 inch spacing might be helping a neighboring farmer harvest corn planted in rows spaced 40 inches apart. If the combine travels parallel to the crop rows, then only 2 rows can be harvested at a time. However, if the combine moves or travels in a direction at an angle to the rows, then the full capacity of the 8 row combine may be utilized. For this example, the combine direction of travel may be at a right angle to the row direction or at other angles to the rows.

These and other features and advantages of the present invention will become apparent to those skilled in the art upon a reading of the following detailed description when taken in conjunction with the drawings wherein there is shown anti described an illustrative embodiment of the invention.

BRIEF DESCRIPTION OF THE DRAWINGS

In the following detailed description, reference will be made to the attached drawings in which:

FIG. 3A is a right side elevational view of the prior art multi-row corn header without the present invention.

FIG. 3B is a left side elevational view of the prior art multi-row corn header without the present invention.

FIG. 4A is a right side elevational view of the multi-row corn header incorporating the outboard crop divider guard assembly of the present invention on the right outboard divider structure.

FIG. 4B is a left side elevational view of the multi-row corn header incorporating the outboard crop divider guard assembly of the present invention on the left outboard divider structure.

DETAILED DESCRIPTION OF THE INVENTION

In General

Figure 1:
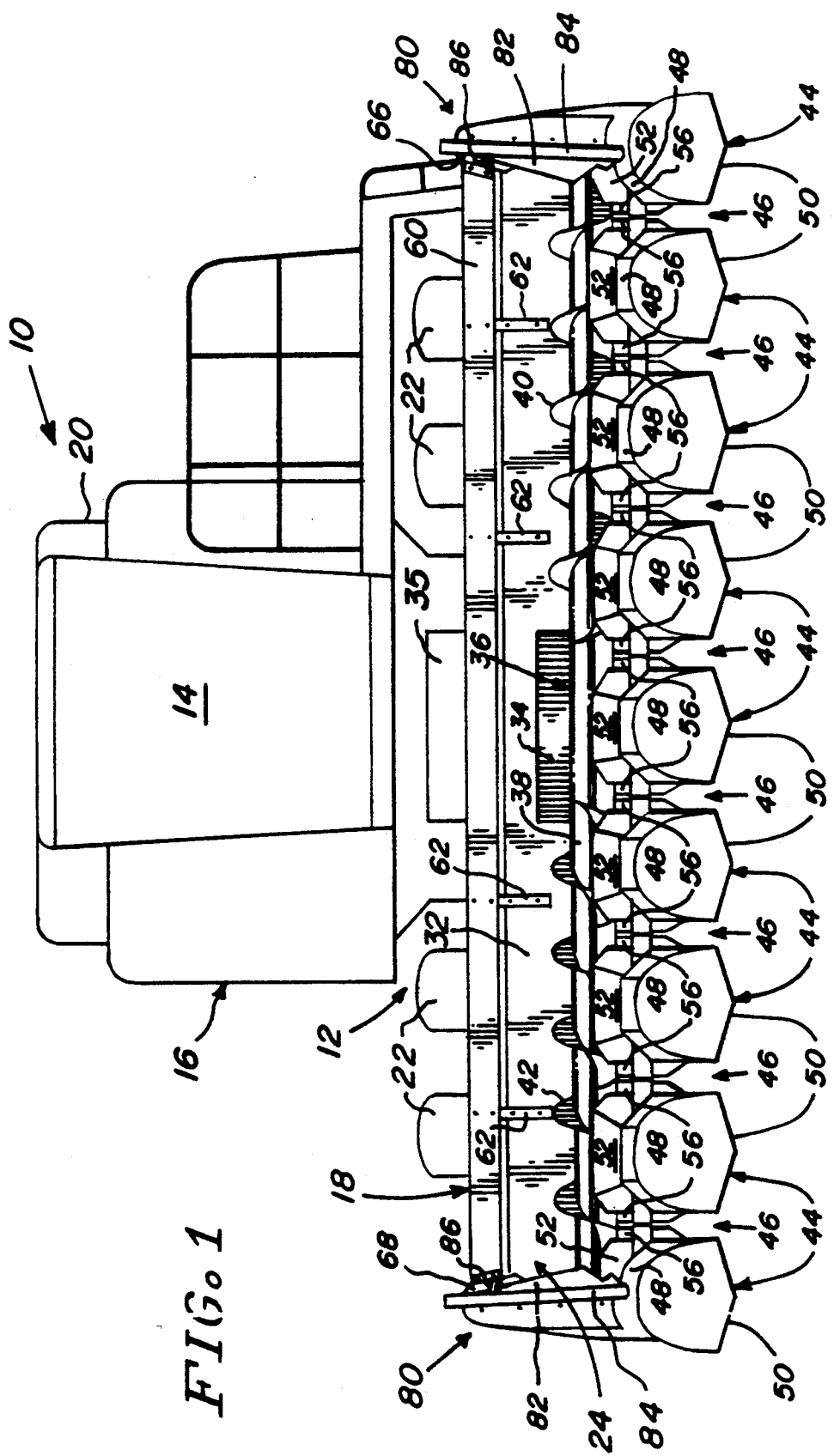
FIG. 1 is a front elevational view of a crop harvesting machine with a multi-row corn combine or header or picker incorporating an outboard crop divider guard assembly of the present invention at each of the opposite lateral ends of the header.
Figure 2:
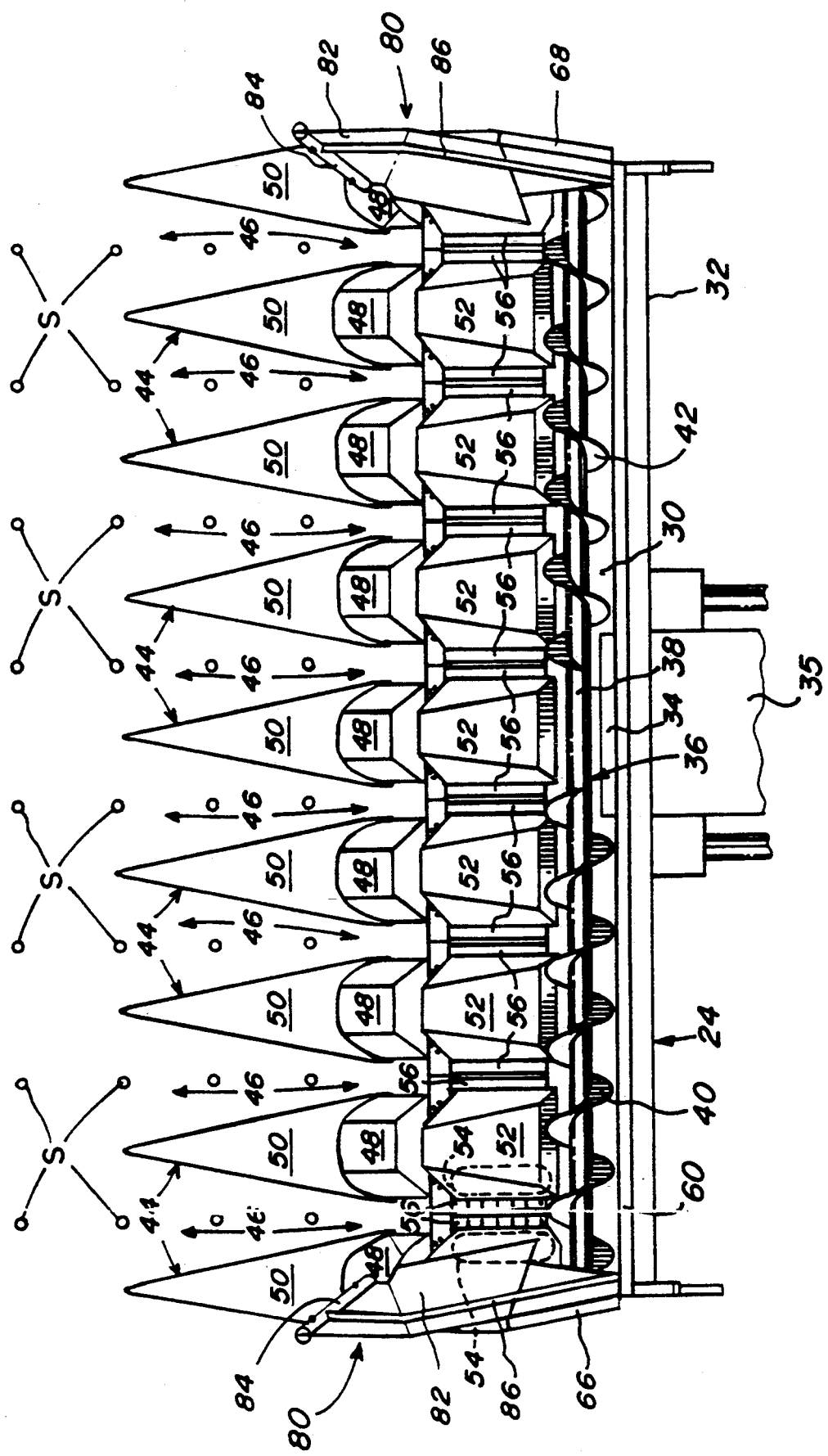
FIG. 2 is a top plan view of the multi-row corn header of FIG. 1.

Referring to the drawings, and particularly to FIGS. 1 and 2, there is illustrated a crop harvesting machine, generally designated 10, which incorporates the present invention. The machine 10 conventionally includes a mobile chassis 12 and has an operator's cab 14, a main housing 16 containing crop processing components (not shown), a multi-row crop gathering header 18, a grain storage bin 20, a rear discharge compartment (not shown), and an engine compartment (not shown), all supported by the chassis 12. The multi-row crop gathering header 18 with which the present invention is employed is specifically a header adapted to gather ears of corn from standing corn stalks. Thus, this type of header is commonly referred to as a corn header or corn picker.

All the moving components of the crop harvesting machine 10 are driven by an internal combustion engine located within the engine compartment. The engine, being of substantial horsepower, is adapted not only to drive all of the moving components of the machine 10 but also is capable of operating the front drive wheels 22 of the machine which, together with the rear wheels (not shown), render the, machine self-propelled. While the present invention will be described in conjunction with a self-propelled machine, it is not so limited; it may just as equally be employed on the corn header of a pull-type crop harvesting machine.

Figure 7:
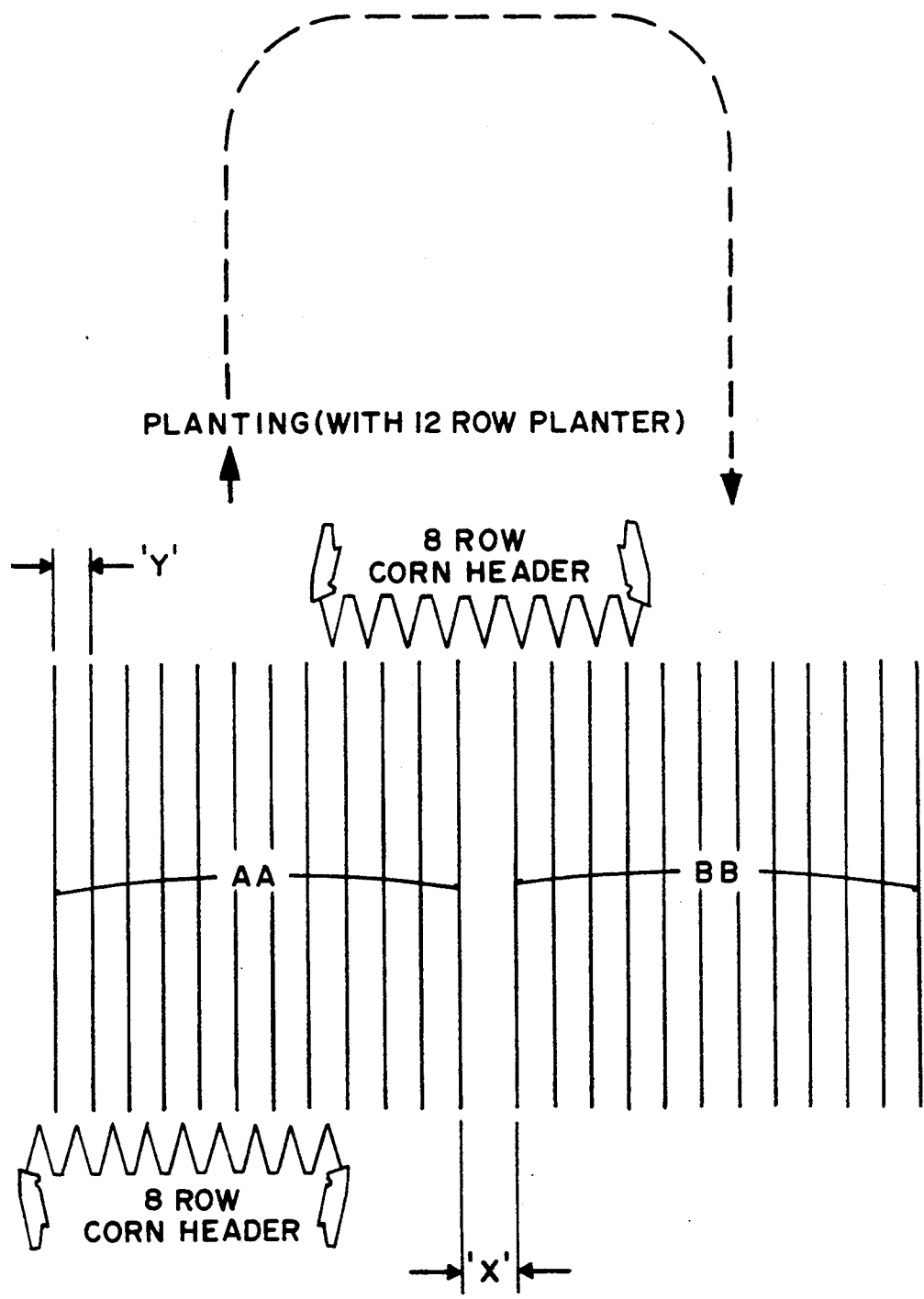
FIG. 7 is a diagram illustrating the problem of misalignment of the passageways of the multi-row corn header with the rows of corn caused by variation in row spacing.

The crop harvesting machine 10 gathers corn ears from standing rows of corn stalks as the machine 10 advances over a field of a row planted corn crop as diagrammatically shown in FIG. 7. The multi-row corn header 18 functions to guide and advance the corn stalks S rearwardly to locations where the ears are stripped from the stalks without removing the stalks from the field. Thereafter, the corn header 18 consolidates the stripped ears of corn at a central location of the header where the consolidated ears are fed rearwardly into the crop processing components of the machine. In this application of the machine 10, these components function to shell the corn kernels from the cobs of the ears and separate the shelled kernels from the cobs as well as from other debris. The shelled corn kernels are then conveyed to the grain storage bin 20 while the cobs and debris are discharged back onto the field. Once full of shelled corn, the storage bin 20 is unloaded to a wagon or truck by use of an unloading auger and boom (not shown) connected to the machine 10.

The multi-row corn header 18 typically includes a frame 24 having left and fight vertical side walls 26, 28 (see FIGS. 3A, 3B, 4A and 4B), a generally horizontal bottom wall 30 (see FIG. 2) and a vertical rear wall 32 with a central discharge outlet 34 defined therein. The discharge outlet 34 leads to the front open end of an elevator 35 which, in turn, leads to the crop processing components contained in the main housing 16 of the machine 10.

Transversely extending between the left and fight side walls 26, 28 of the frame 24 of the header 18 and rotatably mounted thereto is an elongated crop transfer auger 36 having an auger cylinder 38 and left and fight flights 40, 42. The respective flights 40, 42 are spirally wrapped in opposite directions around the auger cylinder 38 inwardly from the respective ends thereof toward the center section so as to laterally convey crop material, in this application., ears of corn, along the auger 36 and horizontal bottom wall 30 in front of the vertical rear wall 32 and consolidate the ears of corn at the central section of the auger 36 in front of the central discharge outlet 34 where the adjacent inner ends of the respective flights 40, 42 function to feed the consolidated ears rearwardly to the elevator 36.

Extending forwardly from and supported by the header frame 24 is a plurality of laterally spaced apart and fore-and-aft extending row crop divider structures or "snoots" 44 that form or define forward crop-receiving passageways 46 therebetween extending parallel to the forward direction of travel of the machine 10 across the field. The passageways 46 respectively receive adjacent rows of corn stalks S as the machine 10 advances over the field. Each of the crop divider structures 44 includes a pair of tandemly-arranged rear and forward portions 48, 50. The rear portion 48 of each divider structure 44 is stationarily or fixedly mounted on the header frame 24, whereas the forward portion 50 of each crop divider structure 44 is pivotally mounted at its rear end at 51 for undergoing vertical pivotal movement relative to the rear portion 48, thereby permitting the front portion 50 to employ a skid shoe (not shown) to gauge and vertically move with the contour of the field. The forward portion 50 of each crop divider structure 44 also typically has a conical or tapered configuration which facilitates the centering of the respective divider structures 44 between the rows of standing corn stalks and alignment of the rows with the passageways 46 between the divider structures 44. This configuration of the forward portions 50 also tends to at least partially lift up twisted and bent corn stalks so that they will be more easily received by the passageways 46.

Supported on the header frame 24 and positioned between the rear portions 48 of the crop divider structures 44 and the transfer auger 36 are a plurality of shrouds 52 overlying mechanisms mounting pairs of upper gathering endless chains 54 and pairs of lower ear snapping rollers 56, the respective pairs being aligned along opposite sides of the crop-receiving passageways 46. As the machine 10 advances across the field, the rows of standing corn stalks are guided by the crop divider structures 44 between the, upper gathering chains 54 and lower snapping rollers 56 of the respective pairs thereof. Then, as the stalks reach the rear ends of the passageways 46 and the header 18 passes over the stalks, the, stalks are, in effect, pulled downwardly between the snapping rollers 56 which then break or snap off the ears from the stalks. The upper gathering chains 54 transport the snapped-off ears rearwardly to the transfer auger 36.

Prior Art Header Rear and Side Wall Height Extensions

As the corn stalks are engaged by the upper gathering chains 54 and pulled rearwardly and as the corn ears are then snapped-off the stalks by the snapping rollers 56, some corn ears are "kicked" upwardly into errant paths which can carry them over the side walls 24, 26 and rear wall 32 of the header resulting in yield loss. To minimize the potential for such loss, the practice heretofore has been to increase the heights of the side walls 24, 26 and of the rear wall 32 of the multi-row corn header 18.

Referring to FIGS. 1, 2, 3A and 3B, to increase the height of the vertical rear wall 32 of the header 18, a vertical height extension panel 60 is installed along and above the vertical rear wall 32. The rear wall height extension panel 60 is mounted in such position by means of a plurality of rear mounting brackets 62 and end mounting brackets 64 attached thereto and to the vertical rear wall 32 of the frame 24. To increase the heights of the vertical side walls 24, 26 of the header 18, a pair of vertical height extension panels 66, 68 are installed along and above of the vertical side walls 24, 26. The side wall height extension panels 66, 68 are mounted in such positions by means of a plurality of corner mounting brackets 70 attached thereto and to the vertical side walls 24, 26 of the frame 24. Also, the left and right side wall vertical height extension panels 66, 68 are mounted so that they are slightly inclined outward.

Further, extending forward from the left and right side wall vertical height extension panels 66, 68 are left and right arcuate side guide panels 72, 74 that are installed above the fixed rear portions 48 of the outboard ones of the crop divider structures 44 of the corn header 18 and attached at their rear edges to the forward edges of time respective left and right side wall vertical height extension panels 66, 68. The forward edges of the left and right arcuate side guide panels 72, 74 are mounted to the respective fixed rear portions 48 of the outboard crop divider structures 44.

Outboard Crop Divider Structure Guard Assembly

While the vertical rear and side wall height extension panels 60, 66, 68 and the arcuate side guide panels 72, 74 tend to reduce crop loss from ejection of errant corn ears over the vertical side and rear walls 24, 26, 32 of the header 18, these features do not address the problem of errant corn ear loss over the outboard ones of the crop divider structures 44 at the opposite lateral ends of the header 18 due to aforementioned conditions of row spacing variation and of bent and tangled stalks. The present invention provides an outboard guard assembly 80 for mounting on each of the opposite outboard crop divider structures 44 at the respective opposite lateral ends of the corn header 18 to address this problem.

Referring to FIGS. 1, 2, 5 and 6, each outboard guard assembly 80 basically includes a barrier means or panel 82 and a support means or tube 84 mounting the barrier panel 82 upright upon and extending over the fixed rear portion 48 of the respective outboard crop divider structure 44 of the header 18. The barrier panel 82 is fabricated from a suitable flat sheet material and the support tube 84 from a suitable tubing material. The outboard guard assembly 80 also includes a reinforcing brace 86 for mounting the barrier panel 82 to the respective opposite lateral end of the header. The brace 86 is fabricated preferably from a suitable material having a fight angle shape in cross-section. Suitable materials can be either a metal, such as aluminum or steel, or a plastic.

Thus, a pair of the outboard guard assemblies 80 are designed to be installed on the two outboard crop divider structures 44 at the left and right ends of the multi-row corn header 18 as shown in FIGS. 1, 2, 4A and 4B. As can be readily understood in FIGS. 1 and 2, the one outboard guard assembly 80 designed to fit on the fight end of the header 18 is a mirror image of the other outboard guard assembly 80 designed to fit on the left end of the header 18.

Each fight and left outboard guard assembly 80 of the present invention is installed on the respective crop divider structure 44 at the respective ends of the multi-row corn header 18 in the following manner. The barrier panel 82 is installed inboard of the respective arcuate side guide panel 72, 74 by fastening the barrier panel 82 at its forward edge portion 82A to the support tube 86, at its rear edge portion 82B to the forward edge portion of the respective side wall vertical height extension panel 66, 68 and at its bottom edge portion 82C to the fixed rear portion 48 of the crop divider structure 44. The support tube 84 extends downwardly through the fixed rear portion 48 of outboard crop divider structure 44 to where it is mounted to the header frame using fasteners (not shown). Thus, the support tube 84 is located forwardly of the respective arcuate side guide panel 72, 74 and is disposed in a slightly inclined outward fashion relative to a vertical plane through the center of the respective outboard crop divider structure 44. Also, the support tube 84 extends upwardly from the center of the fixed rear portion 48 thereof preferably at either a perpendicular or near perpendicular relationship to portion 48 although other angular relationships are within the scope of this invention. The flat barrier panel 82 is also inclined slightly outwardly from the same vertical plane and extends forwardly on the crop divider structure 44 from the respective side wall vertical height extension panel 66, 68. To provide additional strength and support, the reinforcing brace 86 is disposed along and fastened to an inboard side of the barrier panel 82 and extends rearwardly therefrom to where it is fastened to the respective side wall vertical height extension panel 66, 68.

Figure 6A:
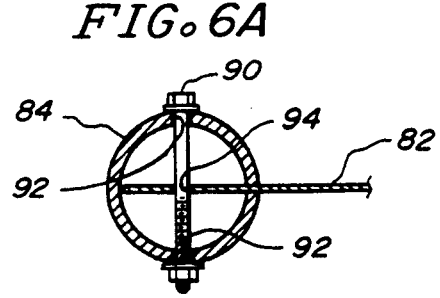
FIG. 6A is an enlarged cross-sectional view taken along line 6A—6A of FIG. 6 showing means for fastening the barrier panel to the support tube of assembly.
Figure 5:
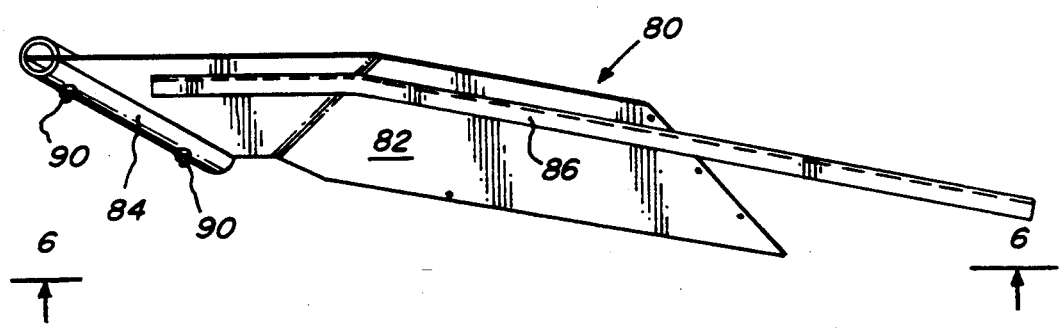
FIG. 5 is a top plan view of a barrier panel, support tube and reinforcing brace of the outboard crop divider panel assembly of the present invention shown removed from the header.
Figure 6:
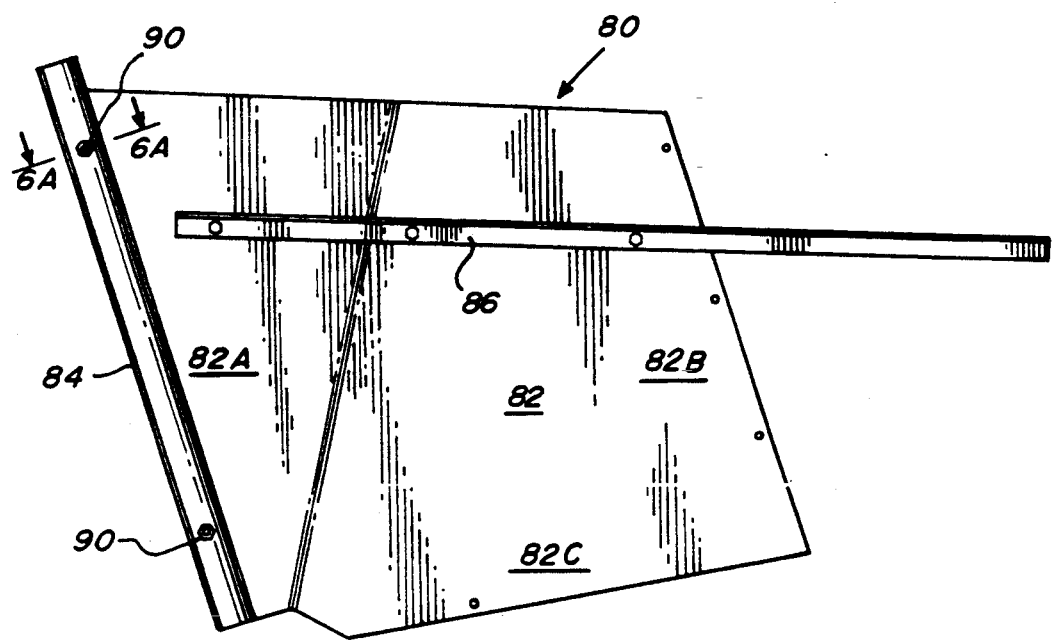
FIG. 6 is a side elevational view of the outboard crop divider panel assembly as seen along line 6—6 of FIG. 5.

The barrier panel 82 may be fastened to the support tube 86 in more than one way. FIGS. 5, 6 and 6A show one embodiment of the present invention where the forward edge of the barrier panel 82 extends through a longitudinal slot 88 formed in the support tube 86. Fasteners 90 are disposed perpendicular to the barrier panel 82 and extend through holes 92 in the support tube 86 and apertures 94 in the barrier panel 82 thereby attaching the barrier panel 82 to the support tube 86. One alternative way is to shape the forward end portion of the barrier panel 82 into an arcuate tubular shape and fit it about the outside of the support tube 86.

The present invention can be easily installed as original equipment at the factory or as an after market accessory. Further it can be easily removed from the combine if so desired.

The present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An outboard guard assembly for mounting on each of a pair of opposite outboard divider structures disposed at respective opposite lateral ends of a multi-row crop gathering header and extending forwardly from a pair of opposite side walls of a frame of the header, said outboard guard assembly comprising:
    (a) support means attachable on each of the opposite outboard crop divider structures to extend upwardly therefrom; and
    (b) a barrier panel attached at a forward end portion to said support means and extending rearwardly therefrom so as to extend along and above a portion of the respective outboard crop divider structure with the support means attached thereon.

2. The assembly of claim 1 further comprising:
    (c) a reinforcing brace disposed along and attached to a side face of said barrier panel and extending rearwardly from said barrier panel for attachment of the frame of the header.

3. The assembly of claim 1 wherein:
    said support means is an elongated tube having a longitudinal slot defined therein; and
    said barrier panel has a forward edge portion extending through said slot and disposed within said support tube.

4. The assembly of claim 3 wherein:
    said support tube further has a plurality of holes defined therethrough; and
    said forward edge portion of said barrier panel also has a plurality of apertures defined therethrough and alignable with said holes through said support tube.

5. The assembly of claim 4 further comprising:
    a plurality of fasteners extending through said holes in said support tube and apertures in said barrier panel being aligned with said holes to thereby attach said barrier panel to said support tube.

6. In combination with a multi-row crop gathering header including a frame and a plurality of crop divider structures extending forwardly from said frame, said crop divider structures including a pair of outboard crop divider structures disposed at respective opposite lateral ends of said header frame and extending forwardly from a pair of opposite side portions of header frame, an outboard guard assembly for mounting on each of said opposite outboard divider structures, said guard assembly comprising:
    (a) a support member attached on each of said opposite outboard crop divider structures and extending upwardly therefrom; and
    (b) a barrier panel attached at a forward end portion to said support member and extending rearwardly therefrom so as to extend along and above a portion of said outboard crop divider structure.

7. The assembly of claim 6 further comprising:
    (c) a reinforcing brace disposed along and attached to a side face of said barrier panel and extending rearwardly from said barrier panel and being attached to a respective one of said side portions of said frame of said header.

8. The assembly of claim 6 wherein said support member and said barrier panel are inclined outwardly relative to a vertical plane through said outboard crop barrier structure.

9. The assembly of claim 6 wherein said support member is mounted on a longitudinal centerline of said outboard crop divider structures.

10. The assembly of claim 6 wherein:
each of said outboard crop divider structures has rear portion fixedly mounted to said header frame and a forward portion pivotally mounted to said rear portion thereof; and
said support member is mounted on said rear portion of said outboard crop divider structure.

11. The assembly of claim 6 wherein:
said support member is an elongated tube having a longitudinal slot defined therein; and
said barrier panel has a forward edge portion extending through said slot and disposed within said support tube.

12. The assembly of claim 11 wherein:
said support tube further has a plurality of holes defined therethrough; and
said forward edge portion of said barrier panel also has a plurality of apertures defined therethrough and alignable with said holes through said support tube.

13. The assembly of claim 12 further comprising:
a plurality of fasteners extending through said holes in said support tube and apertures in said barrier panel being aligned with said holes to thereby attach said barrier panel to said support tube.

14. In combination with a multi-row crop gathering header including a frame having a pair of opposite side walls and a pair of side wall vertical height extension panels mounted on and extending upwardly from said side walls, and a plurality of crop divider structures extending forwardly from said frame, said crop divider structures including a pair of outboard crop divider structures disposed at respective opposite lateral ends of said header frame and extending forwardly from said opposite side walls thereof, an outboard guard assembly for mounting on each of said opposite outboard divider structures, said outboard guard assembly comprising:
(a) a support tube attached on each of said opposite outboard crop divider structures and extending upwardly therefrom;
(b) a barrier panel attached at a forward end portion to said support tube and extending rearwardly therefrom so as to extend along and above a portion of said outboard crop divider structure, said barrier panel being attached at a rearward end portion to a forward end portion of a respective one of said side wall vertical height extension panels; and
(c) a reinforcing brace disposed along and attached to said barrier panel and extending rearwardly from said barrier panel, said reinforcing brace being attached to a respective one of said side wall vertical height extension panels of said header frame.

15. The assembly of claim 14 wherein said support tube and said barrier panel are inclined outwardly relative to a vertical plane through said outboard crop barrier structure.

16. The assembly of claim 14 wherein said support tube is mounted on a longitudinal centerline of said outboard crop divider structures.

17. The assembly of claim 14 wherein:
each of said outboard crop divider structures has rear portion fixedly mounted to said header frame and a forward portion pivotally mounted to said rear portion thereof; and
said support tube is mounted on said rear portion of said outboard crop divider structure.

18. The assembly of claim 14 wherein:
said support tube has a longitudinal slot defined therein; and
said barrier panel has a forward edge portion extending through said slot and disposed within said support tube.

19. The assembly of claim 14 wherein:
said support tube further has a plurality of holes defined therethrough; and
said forward edge portion of said barrier panel also has a plurality of apertures defined therethrough and alignable with said holes through said support tube.

20. The assembly of claim 19 further comprising:
a plurality of fasteners extending through said holes in said support tube and apertures in said barrier panel being aligned with said holes to thereby attach said barrier panel to said support tube.

* * * * *